Patented Dec. 18, 1934

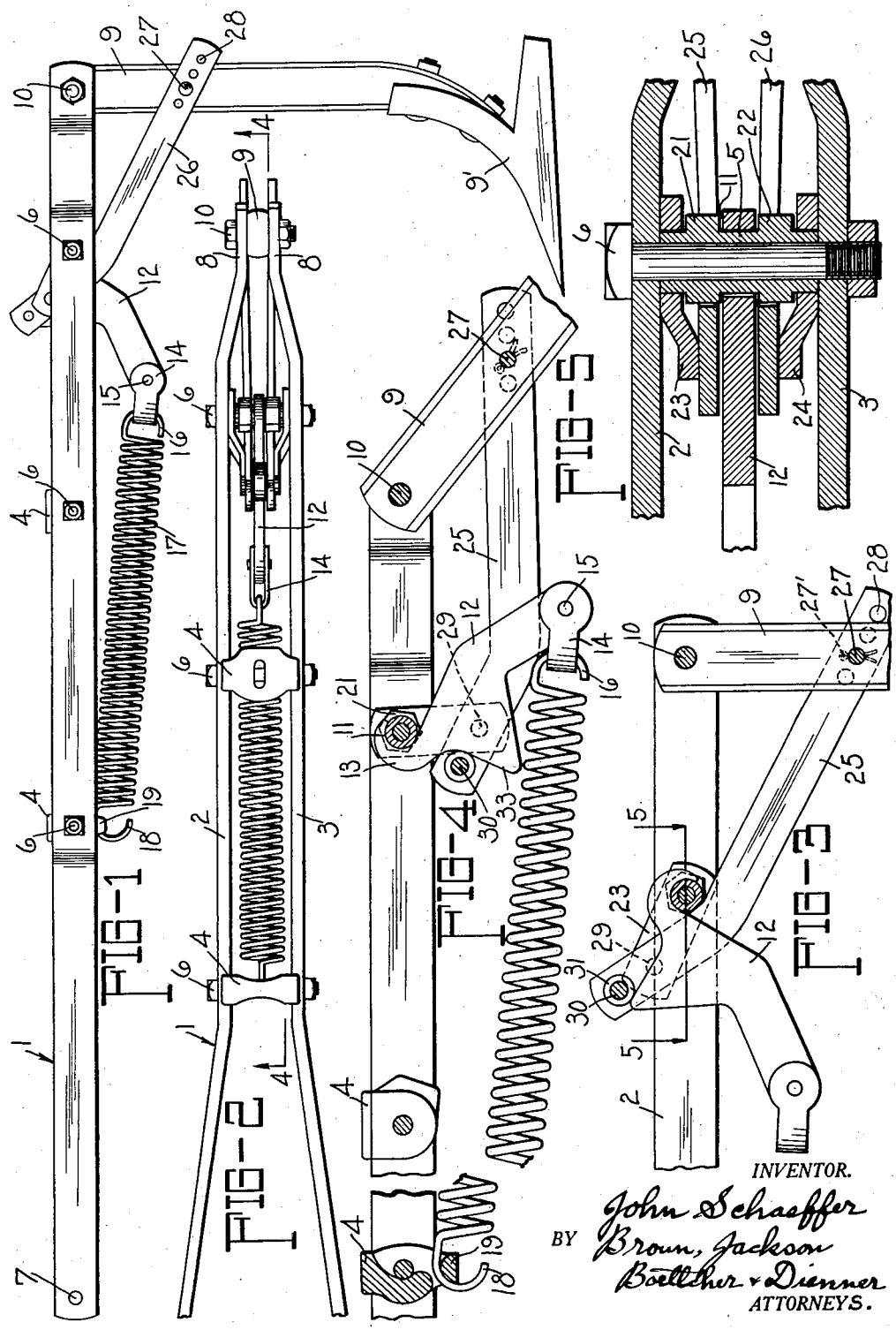

1,984,705

UNITED STATES PATENT OFFICE 1,984,705

CULTIVATOR

John Schaeffer, Horicon, Wis., assignor to Van Brunt Manufacturing Company, Horicon, Wis., a corporation of Wisconsin Application September 28, 1932, Serial No. 635,158

11 Claims. (Cl. 97—184)

This invention relates to cultivators and specifically provides an improved spring trip mechanism for field cultivators and the like.

Cultivators, known to the art as field cultivators, comprise a suitable framework to which beams or draw bars are pivotally attached. At the free ends of these draw bars are mounted tool supporting standards which carry the earth working tools. These standards are pivotally mounted upon the beams so that they may swing rearwardly of the cultivator when the earth working tool engages an obstruction such as a rock or large root.

In cultivators of this class the tool supporting standards are usually held in their normal position by a spring acting through a system of levers connected to the standard and to the beam. The tension of the spring biases the standard into its normal position with a definite pressure, and the spring yields to permit the standard to swing rearwardly when an obstruction is encountered.

Preferably, the spring and lever connecting it to the standard are arranged so that the spring will restore the standard to its normal position as soon as the obstruction has been cleared. In order to restore the standard to its normal position, the spring and levers must be capable of accelerating the earth engaging tool through the ground, particularly if this return to normal movement is to be made while the cultivator is in motion.

In the devices of the prior art of which I am aware, the return to normal movement of the standard cannot be relied upon, particularly when the forward motion of the cultivator is continued. The spring trip mechanism of my invention improves upon the prior art devices by providing a positive return to normal movement of the tool supporting standard and at the same time permits low pressure biasing of the standard in its normal position so that it may be moved out of that position before the cultivator is damaged.

In its preferred form, the spring trip mechanism of my invention includes a spring permanently connected between a fixed length lever and the cultivator beam, and a link connecting the lever to the tool supporting standard. The link is arranged to move with respect to the lever so that the effective leverage of the spring upon the standard may be increased somewhat during the latter portion of the movement of the standard out of its normal position. By this arrangement, the leverage of the spring on the standard is maintained sufficiently high to insure that the standard will be returned to its normal position without stopping the cultivator. Adjustment of the leverage of the spring on the standard when the standard is in its normal position is accomplished by simple means, so that the cultivator may be readily adjusted for different soil conditions.

My invention will be best understood by reference to the accompanying drawing in which a preferred embodiment of it is shown by way of example and in which:

Figure 1 is an elevational view of a cultivator beam and standard, with the spring trip mechanism attached thereto;

Figure 2 is a plan view of the device shown in Figure 1;

Figure 3 is a fragmentary view of the spring trip mechanism drawn to an enlarged scale;

Figure 4 is a longitudinal cross sectional view taken substantially along the line 4—4 of Figure 2 looking in the direction of the arrows; and Figure 5 is a fragmentary cross sectional view taken along the line 5—5 of Figure 3 looking in the direction of the arrows and drawn to an enlarged scale.

Referring now to the drawing in more detail, the cultivator draw bar or beam 1 comprises substantially parallel members 2 and 3 spaced apart by suitable spacers 4 and 5 and held together by bolts 6 extended through the members and spacers. Members 2 and 3 are perforated at 7 to receive suitable king pins by which the members are pivotally attached to the framework of the cultivator. Suitable devices, not shown, are secured to the beam to lift the same by rotating it about the king pin, when it is desired to disengage the soil engaging tool from the ground. The members 2 and 3 extend rearwardly from the framework and converge toward the median line of the beam 1, terminating in parallel portions 8. A tool supporting standard 9 snugly fits between the beam ends 8 and is pivotally mounted therein by a suitable bolt 10. This bolt permits swinging movement of the standard forwardly and backwardly of the beam, as will presently appear. The standard carries a suitable soil working tool 9' which is securely fixed thereto.

The spacing member 5 contains a centrally located annular recess 11 in which is journaled one end of a lever member 12. This lever 12 is provided with a hook-like end 13 which is fitted in the recess 11 to pivotally attach the lever to the beam. A U-shaped clevis clamp 14 is fixed to the free end of the lever 12 by a suitable pivot pin 15. This clamp receives the hooked end 16 of the spring 17, the other end of this spring being provided with a hook 18 which is engaged with a yoke portion 19 of the forward one of the spacing members 4. The spacer 5 is provided with bosses 21 and 22 which define the side walls of the groove 11 and serve to hold the lever centrally in the beam.

Bosses 21 and 22 and the members 2 and 3 of the beam together form a pair of annular recesses around the spacer 5, in which links 23 and 24 are disposed.

A second pair of links 25 and 26 are pivotally secured to the standard 9 by a suitable pin 27 which is projected through one of a plurality of holes 28 in each link. The links 25 and 26 extend forwardly of the standard 9 and are disposed on opposite sides of the lever 12 and pivotally connected to the links 23 and 24 by a suitable pivot pin 29. Links 25 and 26 terminate on opposite sides of a roller 31 which is rotatably mounted therebetween by a suitable pin 30.

Lever 12 is provided with a centrally located generally triangular portion having a straight side 33 which extends radially outward from the pivotal axis of the spacer 5. Roller 31 engages this radial edge 33 and is movable therealong, as will presently appear.

As will be seen in Figures 3 and 4, the tension of the spring acts upon the lever 12 through clevis 14 and tends to rotate the lever 12 in a clockwise direction about the pivotal axis of the spacer 5. The tension of the spring is transmitted through the roller 31 to the links 25 and 26, and tends to move links 25 and 26 and the standard 9 in a clockwise direction about their respective pivotal connections into their respective normal positions in which they are shown in Figures 1 and 3.

As will be seen in Figure 3, this movement of the links and lever is arrested by the engagement of the links 25 and 26 with the bosses 21 and 22, respectively. The pivot pin 29 is moved toward a straight line extended through the axis of the pivot 27 and the axis of the bolt 6, by which the spacer 5 is secured in the beam, but the movement is stopped before the pivots are aligned. The roller 31 engages the lever 12 at or near the free end of the radial edge 33, and the force of spring 17 acting against this roller tends to move the links 25 and 26 so as to bring the axis of pivot 29 into line with the axes of the other pivots.

The bosses 21 and 22 are preferably hexagonal in shape and are located eccentrically of the axis of the bolt 6. The normal positions of the lever and links can be altered by rotating the spacer 5 around the bolt 6. An ordinary wrench may be engaged with either one of these bosses to rotate the spacer, which is then locked against further rotation by tightening bolt 6.

As the cultivator is moved forwardly, the soil engaging tool 9' places a force on the standard 9 that tends to rotate that standard rearwardly of the cultivator, that is, in a counterclockwise direction about the axis of the pivot pin. Such a force places the links 25 and 26 in tension and places the links 23 and 24 in compression. The force also has a component tending to rotate the links 23 and 24 in a counterclockwise direction about the axis of the bolt 6. The lever arm, through which this component of force acts, has length equal to the distance that the axis of the pivot pin 29 is from the straight line drawn through the axes of pivots 27 and 6. That is to say, the lever arm of this force is directly proportional to the amount of the misalignment of the pivotal connections of the links and lever.

When the spacer 5 is rotated to bring into engagement with the links 25 and 26 the faces of the bosses 21 and 22 which are located nearest to the axis of the bolt 6, this lever arm is shortest and consequently the force on the standard 9 required to overcome the tension of spring 17 is maximum. Conversely, when the spacer 5 is rotated so as to bring into engagement with the links 25 and 26 those faces of the bosses 21 and 22 which are located farthest from the axis of the bolt 6, the pivotal axis 29 is moved farther out of line and the lever arm is greatest, and consequently a minimum force is required upon the standard to move the same out of its normal position. Inasmuch as the bosses 21 and 22 are hexagonal, six different adjustments are possible, and these adjustments have been found to be sufficient to adapt the cultivator for satisfactory operation under all soil conditions likely to be encountered, and separate adjustment of the tension of the spring 17 is not required.

As will be readily understood by those skilled in the art, the lever arm, through which the tension of the spring acts to rotate the lever 12 about its pivotal axis, is a maximum length when the axis of the lever is at right angles to the axis of the spring, and that lever arm decreases in length as the lever is moved to increase or decrease this angle. When the lever 12 is in its normal position, in which it is shown in Figure 3, the effective length of this lever arm is small. When the lever 12 is in its normal position the roller 31 is engaged therewith at or near the free end of the radial edge 33, that is to say, the roller is at or near its maximum distance from the axis of bolt 6. Through this arrangement the spring is connected to the standard 9 by a low leverage linkage when the standard is in its normal position. Inasmuch as the final portion of movement of the links 25 and 26 into the position in which they are shown in Figure 3 produces but a small movement of the standard 9, this decrease in the effective leverage of the spring upon the standard does not prevent the spring from moving the standard into its normal position.

Movement of the standard 9 out of its normal position rotates links 23 and 24 in a counterclockwise direction about the axis of bolt 6 to move the pivot pin 29 counterclockwise thereabout. Inasmuch as the pivot pin 29 is nearer to the axis of bolt 6 than the roller 31, this movement causes the roller 31 to move inwardly along the straight edge 33, that is to say, to move nearer to the axis of bolt 6. During this movement, the lever arm of the spring 17 upon the lever 12 increases as the arm rotates until maximum effective leverage is obtained when the axes are normal to each other, as hereinbefore pointed out, and decreases slightly as movement of the lever 12 is continued. This movement is stopped by the clevis 14 striking against the under edges of links 25 and 26, at which time the roller 31 is engaged with the innermost end of the straight edge 33.

Normally, the standard 9 is disposed at substantially right angles to the beam 1; pivotal axes 6, 27 and 29 are nearly in line; and a large force must be exerted on the standard to move it with respect to the beam. When the soil engaging tool strikes an obstruction, sufficient force may be exerted to move the standard. During the initial portion of such movement, that is to say, during the first ten or twelve degrees of movement, the leverage of the spring on the standard decreases rapidly, due to the increase in misalignment of the pivotal axes, and consequently the force required to move the standard is decreased. During the remainder of the movement, the links and levers function to check this decrease in effective leverage so that the force required to move the standard rearwardly remains substantially constant, or may even increase slightly. At the time that the clevis 14 strikes links 25 and 26 to arrest the movement of the standard, the angle between the beam and standard is approximately 120°, which angle is sufficient to permit the tool to clear itself. As soon as the obstruction is cleared, the spring moves the standard back into its normal position. As hereinbefore pointed out, levers 25 and 26 are each provided with a plurality of holes 28. The normal position of the standard 9 and also the final rearward position of the same are varied by moving the pivot pin from one of these holes 28 to another. The pin is held in place by a cotter pin 27', or its equivalent, so that this adjustment may be easily made when it is necessary to do so.

Having thus described my invention, what I consider new and desire to have protected by Letters Patent is pointed out in the appended claims.

What is claimed is:

1. In a spring trip release mechanism for cultivators, a beam, a lever pivoted to the beam for arcuate movement with respect thereto, a spring fixed between the free end of said lever and said beam, a standard pivoted to said beam, means pivotally connected to said standard and slidably engaging said lever whereby the lever arm through which the pivotally connected means acts upon the lever may be varied, and means for shifting the pivotally connected means relative to the lever to alter the leverage of said spring on said standard as the standard is moved rearwardly of the beam to enable the spring to restore the standard to a normal position.

2. The combination of a beam, a tool supporting standard pivotally mounted upon said beam for swinging movement forwardly and rearwardly thereof, a spring fixed on said beam, means connecting said spring to said standard to hold the same in a normal position under fixed tension, said means including a lever member and a link member slidably engaged and movable with respect to each other whereby the lever arm through which one of said members acts upon the other may be varied, and means for shifting said first member relative to said second member to increase the effective leverage of said spring on said standard during the final portion of a movement of the standard rearwardly of the beam.

3. The combination of a beam, a shovel supporting standard pivotally connected to said beam, a lever, pivot means connecting one end of said lever to said beam, a link connected to said beam by said pivot means, a second link pivoted near its rearward end to said standard and pivoted near its forward end to said first link, a roller on the end of said second link contacting said lever, said first link serving to shift the end of said second link, on which the roller is disposed, relative to said lever, and a spring connected between said beam and said lever.

4. The combination of a beam, a tool carrying standard pivotally connected to said beam, a lever pivoted on the beam, a spring connected to said beam and said lever, and link means connecting said lever to said standard, means on said link means engaging said lever, and means for moving said engaging means toward the pivotal connection of said lever to the beam, as said standard is rotated on its pivot rearwardly of said beam, whereby said spring is tensioned and the point of application of the reaction of said link on said lever is moved toward the pivotal connection of said lever to said beam to progressively increase the effectiveness of said spring.

5. In a cultivator, a beam, a standard pivotally connected to one end of said beam, a link, pivotal means connecting said link to said beam, a second link, pivot means connecting said second link to said standard and to said first link, said pivot means being disposed substantially in line when said standard is in a normal position with respect to said beam, a roller on said second link, a lever pivoted to said beam and engaging said roller, said first link being adapted to swing about its pivotal connection with the beam to control the point of engagement of the roller with said lever, and a spring for forcing said lever against said roller to thereby hold said standard in said normal position.

6. In a cultivator, a beam, a lever pivotally connected to said beam, a spring fixed between the free end of said lever and said beam, a tool supporting standard pivotally supported on said beam and adapted to swing rearwardly of the beam when the tool strikes an obstruction, means connected to said standard and engaging said lever, means for controlling said first means to cause the point of engagement of said first means with said lever to move toward the pivotal connection of said lever to said beam as said standard swings rearwardly to compensate for loss of leverage of said spring on said lever, whereby the spring restores the standard to a normal position when the obstruction is cleared.

7. In a cultivator, a beam, a lever pivotally connected to said beam, a spring fixed between said lever and said beam, a standard pivoted to said beam for swinging movement thereon, a pair of links pivoted to said standard and disposed on opposite sides of said lever, a roller between said links at the free ends thereof, said roller engaging said lever, and means for causing said roller to move toward the pivotal axis of said lever as said standard is swung rearwardly of said beam.

8. In a cultivator, a beam, a lever pivotally connected to said beam, a spring fixed between said lever and said beam, a standard pivoted to said beam for swinging movement thereon, a pair of links pivoted to said standard and disposed on opposite sides of said lever, a roller between said links at the free ends thereof, a straight edge on said lever extending radially outward from the axis of the pivotal connection of the lever on the beam, said roller engaging said straight edge, means for causing said roller to move along said edge toward said pivotal axis as said standard is swung rearwardly of said beam, and means on said lever adapted to engage said pair of links to limit the rearward movement of said standard.

9. In a cultivator, a beam, a lever pivotally connected to said beam, a spring fixed between said lever and said beam, a standard pivoted to said beam for swinging movement thereon, a pair of links pivoted to said standard and disposed on opposite sides of said lever, a roller between said links at the free ends thereof, a straight edge on said lever extending radially outward from the axis of the pivotal connection of the lever on the beam, said roller engaging said straight edge, and means including a pair of links journaled for movement around said pivotal axis and connected to said first links at a point between said roller and said standard for causing said roller to move along said edge toward said pivotal axis as said standard is swung rearwardly of said beam.

10. The combination with a pair of members pivotally connected for relative swinging movement, of a link pivotally connected to one of said members, a second link pivotally connected to said first link near the free end thereof, pivot means for connecting the free end of said second link to the other one of said members, a roller mounted on said first link between the free end thereof and the pivotal connection of said second link thereto, a lever journaled on said pivot means and engaging said roller, means tending to rotate said lever to bring the pivotal connection between the links substantially into line with said pivot means and the pivotal connection between said first link and member, and a hexagonal bushing eccentrically journaled on said pivot means, said first link striking said bushing to limit the movement of said lever, said bushing being rotatable on said pivot means to alter the limit position of said first link.

11. In a cultivator, a tool beam, a tool standard pivotally connected therewith, a pair of pivotally connected toggle links, one connected with the standard and the other connected with said beam, the pivot points of said links being so disposed that the links are in folded relation with said points substantially in line when said standard is in one position, a spring biased lever pivotally connected with said beam, and means carried by one of said links and engaging said lever, the point of contact therewith moving radially with respect to the pivot of said lever as the standard is swung about its pivot.

JOHN SCHAEFFER.